United States Patent [19]

Carobolante

[11] Patent Number: 5,572,099
[45] Date of Patent: Nov. 5, 1996

[54] MOTOR SPEED CONTROL WITH CURRENT LIMIT

[75] Inventor: Francesco Carobolante, Portola Valley, Calif.

[73] Assignee: SGS-Thomson Microelectronics, Inc., Carrollton, Tex.

[21] Appl. No.: 316,232

[22] Filed: Sep. 30, 1994

[51] Int. Cl.$^6$ .................................................. H02K 17/32
[52] U.S. Cl. ................... 318/434; 318/254; 388/813; 388/815; 388/911; 330/118
[58] Field of Search ............................ 318/432–434, 318/254, 438, 139; 388/911, 809–815; 330/118–123

[56] References Cited

U.S. PATENT DOCUMENTS

| | | | |
|---|---|---|---|
| 3,868,554 | 2/1975 | Konrad | 318/434 |
| 4,177,434 | 12/1979 | Ida | 318/128 |
| 4,246,622 | 1/1981 | Hosoda et al. | 361/31 X |
| 4,277,710 | 7/1981 | Harwood et al. | 318/118 X |
| 4,331,263 | 5/1982 | Brown | 318/133 X |
| 4,381,478 | 4/1983 | Saijo et al. | 318/687 X |
| 4,457,639 | 7/1984 | Nagai | 318/607 X |
| 5,047,675 | 9/1991 | Cerato et al. | 307/578 |
| 5,154,242 | 10/1992 | Soshin et al. | 173/178 |
| 5,202,614 | 4/1993 | Peters et al. . | |
| 5,202,616 | 4/1993 | Peters et al. . | |
| 5,258,696 | 11/1993 | Le . | |
| 5,293,445 | 3/1994 | Carobolante | 388/813 |
| 5,306,988 | 4/1994 | Carobolante et al. | 318/254 |
| 5,319,289 | 6/1994 | Austin et al. . | |
| 5,329,560 | 7/1994 | Rastegar et al. | 375/120 |
| 5,343,127 | 8/1994 | Maiocchi . | |

OTHER PUBLICATIONS

IEEE Transactions on Consumer Electronics, vol. 35, No. 3, Aug. 1989, "A Full–Wave Motor Drive IC Based on the Back–EMF Sensing Principle", Bahlmann, pp. 415–420.
Electronic Components and Applications, vol. 10, No. 3 "Full–Wave Sensorless drive ICs for brushless DC Motors", Dominique Pouilloux, pp. 2–11, Dec. 1994.
Proceedings of the Conference on Drives/Motors/Controls 1984, Paraskeva et al. "Microprocessor Control of a brushless D.C. Motor".

*Primary Examiner*—David S. Martin
*Attorney, Agent, or Firm*—Rodney M. Anderson; Theodore E. Galanthay; Robert Groover

[57] ABSTRACT

A phase-locked loop (or frequency-locked loop) based circuit for controlling the drive applied to a DC polyphase motor is disclosed. The disclosed circuit includes a clamp circuit, connected to the input of the motor drive amplifier, for limiting the current applied to the drive amplifier, in order to ensure that the power supply is not overloaded. According to one embodiment of the invention, the clamp circuit includes a buffer amplifier having a source leg and a sink leg. During a current control mode, both the source leg and sink leg of the buffer amplifier are enabled to drive the input of the motor drive amplifier; the buffer amplifier is a differential amplifier and applies a feedback signal from the drive amplifier input to control the current applied thereto according to an input limit signal. In a speed control mode, a PLL/FLL circuit controls the drive to the motor drive amplifier, and the source leg of the buffer amplifier is disabled; the sink leg remains enabled, however, so that the current continues to be limited in the speed control mode. According to another embodiment of the invention, a series switch is used to switch the input of the drive amplifier from the buffer amplifier to the PLL/FLL circuit upon switching from current control mode to speed control mode.

20 Claims, 2 Drawing Sheets

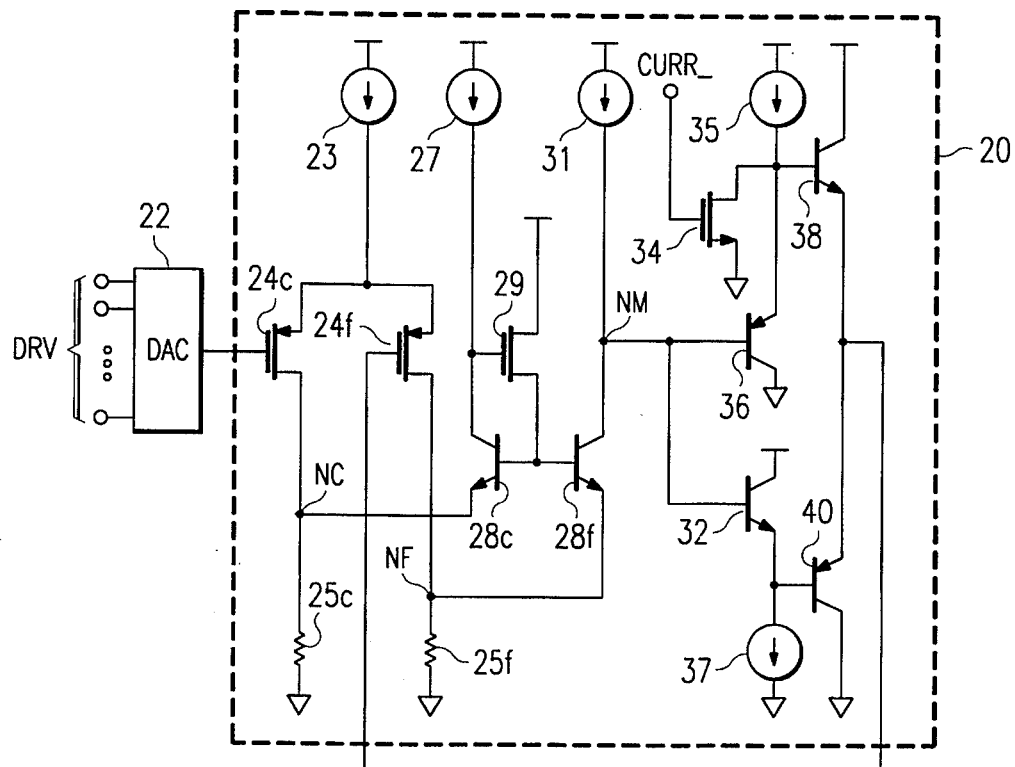
FIG. 4
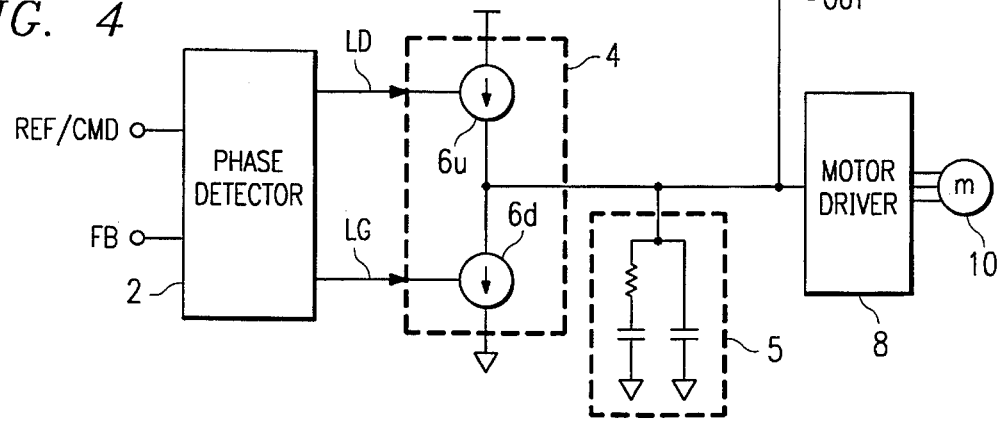
FIG. 5
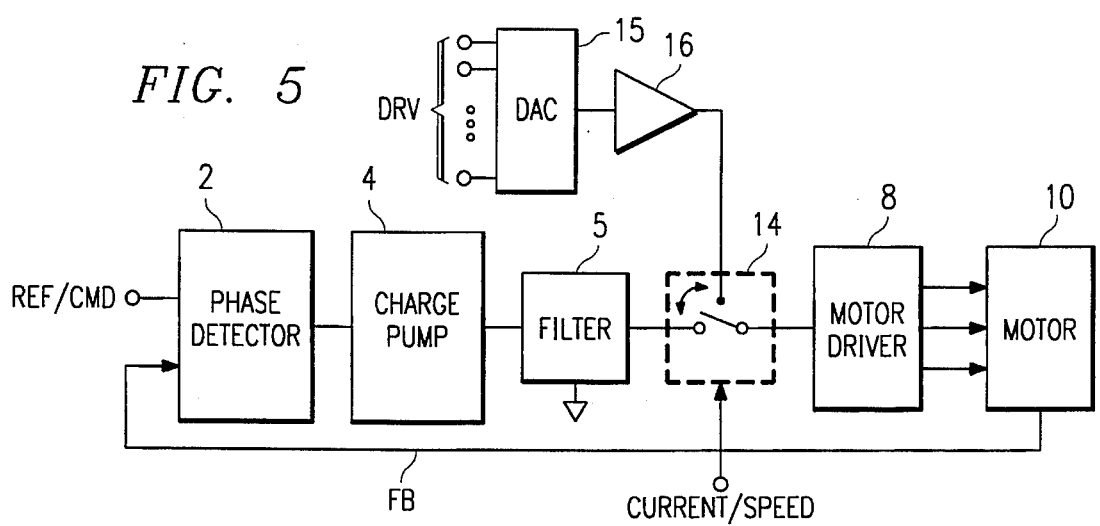

MOTOR SPEED CONTROL WITH CURRENT LIMIT

This invention is in the field of motor control, and is more particularly directed to an integrated circuit for controlling the operation of a polyphase DC motor.

BACKGROUND OF THE INVENTION

As is well known in the art, polyphase DC motors are commonly used in hard disk drives in modern personal computers and workstations, as well as in other important industrial and consumer applications. Particularly in the case of disk drive motors, control of the speed of the motor is important in providing high quality and high speed data storage and retrieval.

A common class of conventional motor control circuits utilizes a phase-locked-loop (PLL), or frequency-locked-loop (FLL), circuit to drive the stator coils of the polyphase motor. According to this arrangement, a feedback signal from the motor indicates the rotational speed (rpm) of the motor. For example, in a so-called "sensorless" motor, the back emf induced in one of the stator coils that is not being driven in each phase is monitored, and a feedback signal is produced corresponding to the frequency at which the monitored back emf crosses a threshold voltage (i.e., undergoes a "zero crossing"). This feedback signal, corresponding to the speed of the motor, is applied to one input of the PLL or FLL and compared against a reference or command signal to produce a control signal. This control signal is applied to the motor driver circuit to supply current to the stator coils at a magnitude corresponding to the difference between the actual motor speed and the desired speed.

Referring now to FIG. 1, an example of such a conventional PLL/FLL based motor speed control circuit will be described. As shown in FIG. 1, stator coils in motor 10 are driven by output from an operational transconductance amplifier (OTA) 8. A feedback signal indicating the speed at which motor 10 is rotating (e.g., a pulse train having a frequency corresponding to the frequency of back emf zero crossings) is communicated on line FB to one input of phase detector 2; a reference, or command, signal (e.g., a signal having a frequency corresponding to the desired motor speed) is applied to a second input of phase detector 2 on line REF/CMD. Phase detector 2 may have the functionality of conventional phase detector circuitry for motor control, such as that of the MC4044 phase/frequency detector manufactured and sold by Motorola. Phase detector 2 provides output signals on lines LD, LG that consist of pulses indicating whether the feedback signal leads or lags the reference or command signal, respectively, with the duration of each pulse proportional to the phase difference between the two.

In this example, two outputs of phase detector 2 are applied to corresponding inputs of charge pump 4. Charge pump 4 is constructed according to the conventional manner for motor control charge pumps, and as such includes two current sources 6u, 6d connected between a power supply voltage and ground, and controlled by lines LD, LG, respectively. Current sources 6u, 6d, respectively source current to and sink current from the output of charge pump 4 according to the duration of pulses on lines LD, LG, respectively. For example, line LD controls current source 4u to apply a fixed current for a duration corresponding to the time by which the command signal on line REF/CMD leads the feedback signal on line FB in phase or frequency (depending on whether the circuit is implemented as a PLL or an FLL); conversely, line LG controls current source 4d to discharge a fixed current for a duration corresponding to the time by which the command signal on line REF/CMD leads the feedback signal on line FB in phase or frequency. As such, charge pump 4 presents a current-based signal at its output that corresponds to the frequency and duration of the pulses received from phase detector 2.

The output of charge pump 4 is usually applied to an integrating filter 5 to generate a signal on node OUT corresponding to the integral of the current output from charge pump 4, and thus corresponding to a charge having an amount corresponding to the phase or frequency relationship of the command and feedback signals. Node OUT is connected to the input of motor driver 8, which drives stator coils of motor 10 responsive to the signal applied to node OUT. For example, as described in U.S. Pat. No. 5,306,988, issued Apr. 26, 1994, assigned to SGS-Thomson Microelectronics, Inc. and incorporated herein by this reference, the output of motor driver 8 may be applied to the gates of pull-down devices in a push-pull driver circuit during the appropriate phases of the commutation sequence. In this example, if motor 10 is operating slower than desired, for example during motor start up, phase detector 2 will cause a signal to be applied to motor driver 8 to increase the drive current through stator coils in motor 10, thus increasing the motor speed. The construction and operation of motor driver 8 is known in the art, and may include various buffer stages as well as power devices controlled according to the desired commutation sequence and mode.

However, during startup conditions, phase detector 2 will detect that motor 10 is turning at a much slower rate than that indicated by the command signal on line REF/CMD. As such, charge pump 4 will apply its maximum output to the input of motor driver 8 to drive stator coils of motor 10 with the available maximum power. However, this situation can cause overloading of the power supply. Such overloading is especially undesirable in portable personal computers and the like that are powered from batteries.

By way of further background, certain motor control circuits utilize a high level of intelligence, for example implemented into a digital signal processor (DSP), to control the speed of the motor and also limit its current. The use of such high performance processing for motor control results in significantly higher cost, as compared to motor speed control circuits using PLL or FLL control loops.

It is therefore an object of the present invention to provide a motor control circuit that provides speed control while limiting coil current, in a PLL/FLL based motor control circuit.

It is a further object of the present invention to provide such a circuit that does not require series switching to accomplish the current control.

It is a further object to provide an amplifier circuit that can force an output node to a desired level in one mode, and that can be used in a second mode to clamp the signal applied to the output node by another circuit.

Other objects and advantages of the present invention will be apparent to those of ordinary skill in the art having reference to the following specification together with the drawings.

SUMMARY OF THE INVENTION

The invention may be incorporated into a motor control circuit by way of a clamp circuit applied to the input of the drive amplifier driving the motor coils. The clamp circuit is preferably operable, in a current control mode, to apply a limited current to the input of the drive amplifier; a phase-locked loop (or frequency-locked loop) is used to drive the amplifier during a speed control mode. Preferably, the clamp circuit includes a buffer amplifier that is enabled to sink excess current (but not source current) during speed control mode.

BRIEF DESCRIPTION OF THE DRAWINGS

FIG. 4 is an electrical diagram, in schematic form, of the construction of the buffer amplifier in the clamp circuit of FIG. 3, as incorporated into the motor control circuit of FIG. 2 according to the first preferred embodiment of the invention.

FIG. 5 is an electrical diagram, in block and schematic form, of a motor control circuit according to an alternative embodiment of the invention.

DETAILED DESCRIPTION OF THE PREFERRED EMBODIMENTS

Figure 1:
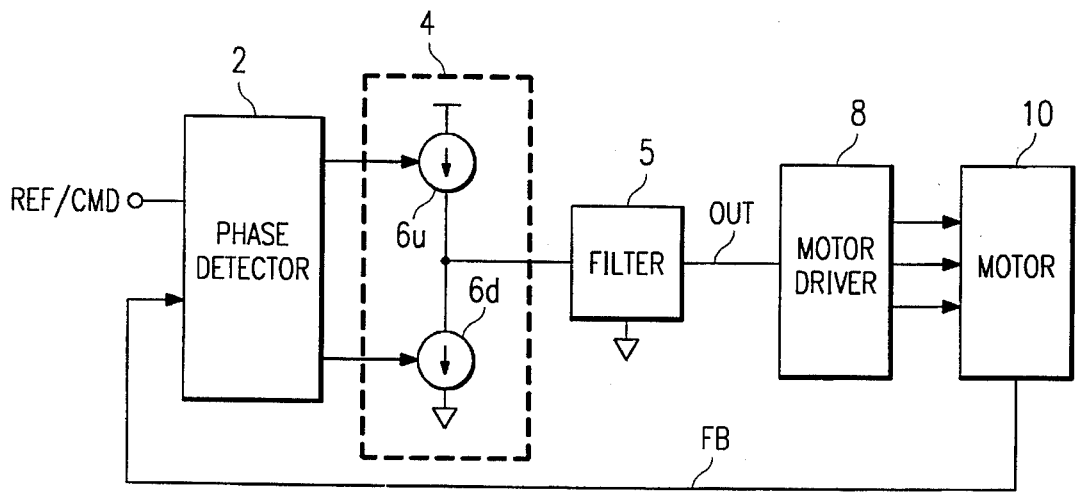
FIG. 1 is an electrical diagram, in block and schematic form, of a motor control circuit according to the prior art.
Figure 2:
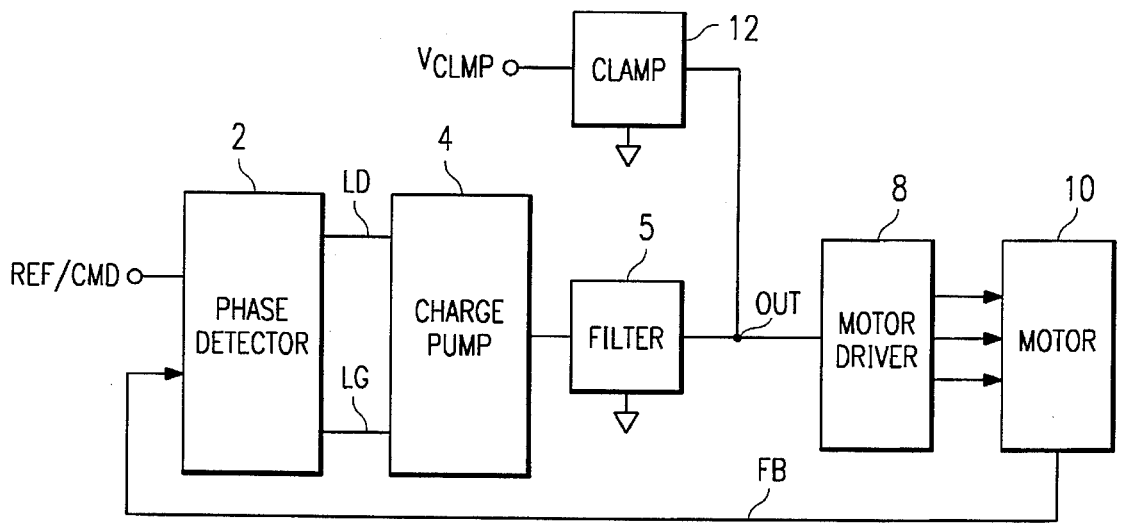
FIG. 2 is an electrical diagram, in block and schematic form, of a motor control circuit according to a first preferred embodiment of the invention.

FIG. 2 illustrates a PLL-based motor control circuit, including a technique for limiting the drive current according to a preferred embodiment of the invention. The circuit of FIG. 2 is constructed similarly as that shown in FIG. 1, and as such like reference numerals will be used for like components of the circuit. As before, stator coils in motor 10 are driven by output from an operational transconductance amplifier (OTA) 8. A feedback signal indicating the speed at which motor 10 is rotating (e.g., a pulse train having a frequency corresponding to the frequency of back emf zero crossings) is communicated on line FB to one input of phase detector 2 while the second input receives a signal having a frequency corresponding to the desired motor speed from external to the circuit. As before, phase detector 2 may have the functionality of conventional phase detector circuitry for in motor control, such as that of the MC4044 phase/frequency detector manufactured and sold by Motorola; as such, phase detector 2 generates a series of pulses on lines LD, LG indicating whether the reference or command signal leads or lags the feedback signal, respectively, with the pulse duration proportional to the duration of the phase difference.

As before, the outputs of phase detector 2 are applied to corresponding inputs of charge pump 4, which is constructed according to the conventional manner for motor control charge pumps as discussed above. As such, charge pump 4 sources or sinks current at its output in a manner corresponding to the duration of pulses received from phase detector 2.

In this example, as described above, the output of charge pump 4 is applied to integrating filter 5. The output of integrating filter 5 at node OUT drives the input of motor driver 8, which in turn drives stator coils of motor 10. As described above and in the above-incorporated U.S. Pat. No. 5,306,988, motor driver 8 can be used to drive the gates of pull-down devices in a push-pull driver circuit during the appropriate phases of the commutation sequence.

Alternatively, other arrangements for generating a signal corresponding to the difference between monitored motor speed and a command or reference input, and applied to the input of motor driver 8, may benefit from the present invention. Examples of such arrangements are described in U.S. Pat. No. 5,293,445, issued Mar. 8, 1994, and in U.S. Pat. No. 5,329,560, issued Jul. 12, 1994, both assigned to SGS-Thomson Microelectronics, Inc., and incorporated herein by this reference.

According to the present invention, it is beneficial to limit the voltage applied to the input of motor driver 8, and thus the current applied to the input of coils in motor 10, to ensure that the power supply is not overdriven. In the preferred embodiment of FIG. 2, clamp circuit 12 is connected at the output of integrator 6 (i.e., at the input to motor driver 8), and also to a reference voltage such as ground. Clamp circuit 12 thus can conduct excess current from the output of charge pump 4 (or integrating filter 5) to the reference voltage, limiting the current applied to the input of motor driver 8, as will be described in further detail hereinbelow. Clamp circuit 12 receives an input on line CLMP, the value of which defines the magnitude of the current limit.

Figure 3:
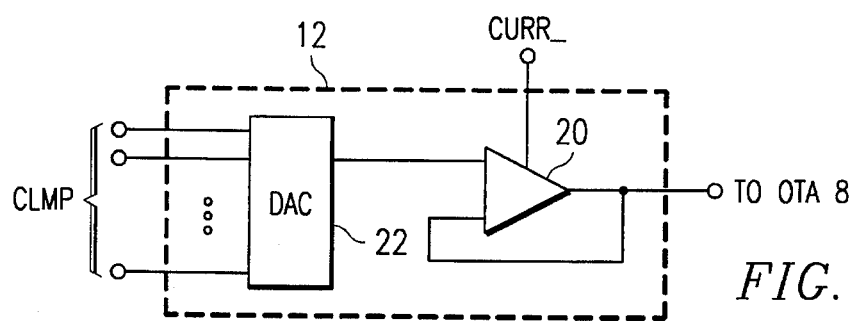
FIG. 3 is an electrical diagram, in block and schematic form, of the preferred construction of the clamp circuit in the motor control circuit of FIG. 2.

As shown in FIG. 3, clamp circuit 12 according to the preferred embodiment of the invention may be implemented to be under the control of a mode select signal on line CURR_; line CURR_ is preferably driven by a microprocessor-based controller, or by some other overall controlling circuit within the motor control circuit. In this example, clamp circuit 12 includes digital-to-analog converter (DAC) 22 and buffer amplifier 20. DAC 22 receives a digital control input on lines CLMP, and presents a corresponding analog current or voltage signal to a first input of buffer amplifier 20. Alternatively, an external voltage may be applied directly to the first input of buffer amplifier 20, for example by way of a voltage divider, bandgap circuit, or other reference circuit. Buffer amplifier 20, as will be described hereinbelow, sources a controlled voltage to motor driver 8 at node OUT while in current control mode, and sinks current therefrom while in speed control mode; the mode selection between current control mode and speed control mode is made by the mode select signal presented to buffer amplifier 20 on line CURR_. The output of buffer amplifier 20 is fed back to a second input thereto, so that buffer amplifier 20 operates substantially as an operational amplifier with negative feedback.

Referring now to FIG. 4, the incorporation of buffer amplifier 20 of FIG. 3 into the motor control circuit, and also its detailed construction, according to the preferred embodiment of the invention will now be described. As described hereinabove, phase detector 2 receives feedback line FB and reference or command signal line REF/CMD at its inputs. In this example, phase detector 2 presents two output lines LD, LG to charge pump 4; output line LD carries pulses of a width proportional to the phase difference by which the feedback signal leads the reference or command signal, while output line LG carries pulses of a width proportional to the phase difference by which the feedback signal lags the reference or command signal. Charge pump 4 is constructed in the conventional manner, including current source 6u connected between $V_{cc}$ and node OUT, and current source 6d connected between node OUT and ground. As discussed above, current sources 6u, 6d are controlled by signals communicated on lines LD, LG, respectively, so that each of current sources 6u, 6d conduct a current at a fixed level for the duration of an active pulse on its corresponding control input. Current sources 6u, 6d may be implemented according to conventional techniques, such as by way of properly biased field effect transistors. Charge pump 4 thus presents a high output impedance to node OUT.

The output of charge pump 4 is filtered by integrating filter 5, implemented in this example by way of a shunt R-C network connected to ground. Of course, other implementations may also be used to produce the integrating function, depending upon the particular characteristics of the loop. For example, if an active integrator is used, it would have its input connected to the output of charge pump 4, and its output driving node OUT at the input to motor driver 8 (and connected to the output of buffer amplifier 20). The output of charge pump 4 is forwarded to node OUT at the input of motor driver 8, which in turn drives motor 10 as described hereinabove.

The construction of buffer amplifier 20 according to the preferred embodiment of the invention will now be described in detail. The output of DAC 22 is connected to the gate of p-channel transistor 24c in an input differential stage of buffer amplifier 20; the drain of transistor 24c is connected, at node NC, to ground via resistor 25c, and to the emitter of n-p-n transistor 28c in a second differential stage of buffer amplifier 20. P-channel transistor 24f in the first differential stage of buffer amplifier 20 receives the output of buffer amplifier 20 at its gate, and has its drain connected, at node NF, to the emitter of n-p-n transistor 28c in a second differential stage of buffer amplifier 20. The sources of transistors 24c, 24f are connected to current source 23, which provides current from power supply $V_{cc}$. As such, in the conventional manner, the differential voltage between nodes NF, NC corresponds, in inverted fashion, to the differential voltage between the output of buffer amplifier 20 (i.e., at node OUT) and the analog output of DAC 22.

In the second stage of buffer amplifier 20, the bases of transistors 28c, 28f are connected together to the source of n-channel transistor 29; the drain of transistor 29 is connected to $V_{cc}$, and its gate is connected to the collector of transistor 28c. The collector of transistors 28c is biased by current source 27. The output of this second stage is at node NM, which is the collector of transistor 28f. The collector of transistor 28f, at node NM, is biased by current source 31 to $V_{cc}$ and is also connected to the bases of n-p-n transistor 32 and p-n-p transistor 36 in the push-pull output stage of buffer amplifier 20.

In the pull-up side of buffer amplifier 20, transistor 36 has its collector biased to ground and its emitter biased by current source 35 (from $V_{cc}$), and connected to the base of pull-up n-p-n transistor 38. Pull-up transistor 38 has its collector biased to $V_{cc}$ and its emitter driving the output of buffer amplifier 20 at node OUT (connected to the input of motor driver 8). Mode control n-channel transistor 34 has its drain connected to the emitter of transistor 36 (and thus to the base of pull-up transistor 38), its source biased to ground and its gate receiving the mode control signal on line CURR_, which is presented by a microprocessor-based or other controller circuit within the motor control circuit. As such, when line CURR_ is low, indicating that current control mode is selected, transistor 34 is turned off. Conversely, when line CURR_ is high, indicating that speed control-mode is selected, transistor 34 will be turned on, shorting the base of transistor 38 to ground, turning off transistor 38. This operation will be described in further detail hereinbelow.

On the pull-down side of the output stage of buffer amplifier 20, transistor 32 has its collector biased to $V_{cc}$ and its emitter biased by current source 37 to ground. The emitter of transistor 32 is connected to the base of pull-down p-n-p transistor 40, which has its collector biased to ground and its emitter driving the output of buffer amplifier 20 at node OUT. As will be evident, transistor 40 is enabled both in current control mode and in speed control mode (i.e., regardless of the state of line CURR_).

The operation of the circuit of FIG. 4 will now be described in detail, for the case where motor 10 is initially started up and is driven to a desired speed. According to this embodiment of the invention, operation begins in current control mode, in which the drive current supplied to motor 10 is controlled to a level below that which would overload the power supply ($V_{cc}$). Operation will subsequently switch into speed control mode, at which time phase detector 2 and charge pump 4 will control the drive of motor 10, to an extent limited by clamp circuit 12.

In current control mode, mode control signal line CURR_ is at a low logic level, turning off transistor 34 so that it does not affect the operation of buffer amplifier 20. At this time during motor startup, the difference in phase and frequency between the feedback signal on line FB and the reference or command signal on line REF/CMD is such that charge pump 4 is turned fully on. According to this embodiment of the invention, the drive from charge pump 4 is less than that provided by buffer amplifier 20 in current control mode, and as such the operation of charge pump 4 will not affect the signal at the input of motor driver 8, especially considering the high output impedance of charge pump 4.

At this time during motor startup, the voltage at the output of buffer amplifier 20 (node OUT) is substantially lower than the reference voltage applied at the output of DAC 22. As such, transistor 24f will be turned on harder than will transistor 24c, driving node NF to a higher voltage than node NC, due to a higher current passing through resistor 25f than through resistor 25c (resulting in a larger voltage drop across resistor 25f, relative to resistor 25c). This differential voltage will result in transistor 28c being turned on harder than transistor 28f in the second stage of buffer amplifier 20, reducing the current through transistor 28f. The low conduction through transistor 28f will force the current from current source 31 to the bases of transistors 32, 36, turning on n-p-n transistor 32 and turning off p-n-p transistor 36. With transistor 32 turned on, the current required by current source 37 will be supplied by transistor 32, forcing excess current into the base of pull-down p-n-p transistor 40, turning it off. Conversely, with transistor 36 turned off, the current from current source 35 will be applied to the base of pull-up transistor 38, turning it on. Transistor 38 will thus drive node OUT at the output of buffer amplifier 20 until the voltage at the output substantially reaches that presented by the output of DAC 22, or until the differential voltage between nodes NC, NF is zero. Buffer amplifier 20 will thus reach a balanced operating point where the voltage at node OUT substantially matches the input signal provided to transistor 24c by DAC 22.

Variations in output drive that cause node OUT at the output of buffer amplifier 20 to rise above the output of DAC 22 would in turn cause node NM to source rather than sink current (the voltage of node NC being higher than node NF, in such a case). In this case, transistor 28f would conduct more than transistor 28c, which would draw current from the bases of transistors 32 and 36, turning transistor 32 off and transistor 36 on. With transistor 32 turned off, the current of current source 37 would be conducted from the base of p-n-p transistor 40, turning transistor 40 on to pull the output of buffer amplifier 20 (node OUT) low. Meanwhile, with transistor 36 turned on, transistor 40 would turn off.

As a result of this push-pull operation in current control mode, the steady state output of buffer amplifier 20 in current control mode thus provides a drive voltage to motor driver 8 that is set to a level corresponding to the digital input on lines CLMP.

The voltage supplied by buffer amplifier 20 to the input of motor driver 8 is not disturbed in any way by charge pump 4 in this current control mode. This is because of the effectively high impedance presented at the output of charge pump 4. Accordingly, the drive presented to motor driver 8 is fully under the control of buffer amplifier 20, by way of the signal CLMP applied to the input of DAC 22.

Once a desired operating speed threshold is reached, the system preferably switches into speed control, effected by line CURR_ going to a high logic level. This high logic level turns on transistor 34, pulling the base of transistor 38 to ground, and thus ensuring that transistor 38 will not source any current from $V_{cc}$ to node OUT at the output of buffer amplifier 20 (i.e., the current from current source 35 will be conducted through transistor 34 to ground, starving the base of transistor 38). Accordingly, buffer amplifier 20 is disabled from sourcing current to the input of motor driver 8 in speed control mode, since transistor 38 is forced off. The current supplied to the input of motor driver 8 in speed control mode is thus fully determined by phase detector 2 and charge pump 4.

However, during speed control mode, buffer amplifier 20 according to this embodiment of the invention is able to sink excess current from node OUT via transistor 40. As a result, the drive applied to the input of motor driver 8 is therefore limited to a desired level during speed control mode by this embodiment of the invention.

In speed control mode, if the speed of motor 10 is below the desired or commanded level, phase detector 2 will cause charge pump 4 to increase the signal at its output, which is applied to the input of motor driver 8. Since transistor 38 in buffer amplifier 20 is disabled at this time, buffer amplifier 20 will not assist in this increase of the signal. However, if the signal applied by charge pump 4 to the input of motor driver 8 exceeds the current limit set by digital input CLMP to DAC 22, transistor 24c in buffer amplifier 20 will be turned on relatively hard as compared to transistor 24f, drawing node NF lower than node NC and decreasing the current from node NM into the base of transistor 32. The reduced collector current in transistor 32 in this condition will mean that additional base current is pulled from transistor 40 by current source 37, turning transistor 40 on to sink current from node OUT (from the output of charge pump 4) to ground through transistor 40. Accordingly, the current applied to the input of motor driver 8 is limited according to the digital input CLMP to DAC 22 in speed control mode, through the sinking action of buffer amplifier 20.

Alternatively to the arrangement of FIG. 4, it is contemplated that a double switch may be applied to the base of transistor 38 so that, in speed control mode, transistor 36 remains conductive. For example, the emitter of transistor 36 may be switched to be biased to receive $V_{cc}$ (via a current source) in speed control mode. In this way, current cancellation of the base currents of transistors 36, 32 may be effected, which will reduce the offset of buffer amplifier 20.

According to the preferred embodiment of the present invention, therefore, the drive current of a motor control circuit may be limited to avoid power supply overloading both in a current control start-up mode, and also in a speed control mode where a PLL (or FLL) is controlling the drive current. The transfer from current control mode to speed control mode, with the current limiting function occurring automatically, is made according to this embodiment of the invention in a glitch-free manner, as no series switch is present between phase detector 2 and the input to motor driver 8.

Referring now to FIG. 5, an alternative embodiment of the invention will now be shown, in which open loop control of the current in current control mode is effected. As shown in FIG. 5, DAC 15 receives an input signal on lines DRV, and presents an analog drive signal to the input of buffer amplifier 16; the output of buffer amplifier 16 is applied to switch 14. If desired, buffer amplifier 16 may be implemented to have differential inputs, in which case its inverting input would receive its output to provide negative feedback control. The circuit of FIG. 5 also includes phase detector 2, which receives a feedback signal on line FB and a reference or command signal on line REF/CMD, and generates one or more series of pulses to charge pump 4. Series or shunt filter 5 applies the output of charge pump 4 to integrator 6 which, in turn, applies its output to switch 14. Switch 14 has a control input that switches its output, connected to the input of motor driver 8, to either the output of buffer amplifier 16 or the output of integrator 6 (from charge pump 4), depending upon the state of the signal on line CURRENT/SPEED. The output of switch 14 is applied to the input of motor driver 8 as before, which in turn drives motor 10.

In operation, motor 10 begins in a startup mode, where its speed is much less than the desired motor operating speed. To drive motor 10 to its desired speed as quickly as possible, line CURRENT/SPEED causes switch 14 to connect its output to the output of buffer amplifier 16. Buffer amplifier 16 drives the input of motor driver 8 with a voltage and current corresponding to that presented on lines DRV to DAC 15, communicated to the input of buffer amplifier 16 by the analog output of DAC 15. The drive current applied to motor driver 8 is thus limited under the control of DAC 15. Switch 14 isolates the output of integrator 6, and thus the output of charge pump 4, from being applied to motor driver 8 in this operating mode.

Once a certain motor speed threshold has been reached, the system can switch into speed control mode, in which event the logic level on line CURRENT/SPEED will make a transition and cause the input of motor driver 8 to receive the output of integrator 6. DAC 15 and buffer amplifier 16 will be isolated from motor driver 8 in this speed control mode. The drive applied to the input of motor driver 8 will thus correspond to the results of the phase comparison performed by phase detector 2. However, in this alternative embodiment of the present invention, no current limiting (other than that provided by phase detector 2 based on the signal on line REF/CMD) is provided during speed control mode; rather, only the speed of the motor is necessary to effect control of motor 10.

According to the present invention, therefore, current limiting control may be implemented in a motor control circuit, either in a current control mode individually, or both in a current control mode and a speed control mode without significant switching transient conditions being generated.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A motor control circuit, comprising:

a phase detector, having a first input for receiving a feedback signal indicating the speed of a motor and having a second input for receiving a command signal, for generating a phase detector output signal corresponding to the phase difference between a signal received on said first input and a signal received on said second input;

circuitry for generating a drive signal responsive to the phase detector, said drive signal being an analog signal having an amplitude which is dependent on the amplitude of the drive to be applied to the motor;

a drive amplifier for receiving the drive signal, and for driving coils of a motor responsive thereto; and a buffer amplifier having a first input for receiving a current limit signal, having a feedback input, and having an output coupled to the input of the drive amplifier and to the feedback input of the buffer amplifier, for controlling the amplitude of the drive signal applied to the drive amplifier in a manner corresponding to the current limit signal;

wherein the buffer amplifier operates to both sink current from and source current to the input of the drive amplifier in a current control mode, and to sink excess current from but not source current to the input of the drive amplifier in a speed control mode.

2. The circuit of claim 1, further comprising:

a digital-to-analog converter, for receiving a digital current limit signal and for generating an output signal coupled to the first input of the buffer amplifier.

3. The circuit of claim 1, wherein the buffer amplifier has a control input for receiving a mode select signal indicating whether the current control mode or the speed control mode is enabled.

4. The circuit of claim 1, wherein the circuitry for generating a drive signal comprises:

a charge pump, having an input coupled to the phase detector and having an output coupled to the drive amplifier.

5. The circuit of claim 4, wherein the circuitry for generating a drive signal further comprises:

a filter, connected to the output of the charge pump.

6. The circuit of claim 1, further comprising:

a switch, having a first input for receiving the output of the circuitry for generating a drive signal, having a second input for receiving the output of the buffer amplifier, having a control input for receiving a mode select signal indicating whether a current control mode or a speed control mode is enabled, and having an output coupled to the input of the drive amplifier, wherein the switch couples the output of the buffer amplifier to the input of the drive amplifier in the current control mode, and couples the output of the generating circuitry to the input of the drive amplifier in the speed control mode.

7. A motor control circuit comprising:

a phase detector, having a first input for receiving a signal indicating the speed of a motor and having a second input for receiving a command signal;

circuitry for generating a drive signal responsive to the phase detector;

a drive amplifier for receiving the drive signal, and for driving coils of a motor responsive thereto; and a clamp circuit, having an input for receiving a current limit signal, and having an output coupled to the drive amplifier, for providing a controlled voltage to the drive amplifier corresponding to the current limit signal, wherein the clamp circuit comprises a buffer amplifier having a first input for receiving a signal corresponding to the current limit signal, having a feedback input, having a control input for receiving a mode select signal indicating whether a current control mode or a speed control mode is enabled, and having an output coupled to the input of the drive amplifier and coupled to the feedback input of the buffer amplifier, said buffer amplifier operating to sink current from and source current to the input of the drive amplifier in the current control mode, and to sink excess current from the input of the drive amplifier in the speed control mode, and comprising:

a differential stage, having a first input for receiving the signal corresponding to the current limit signal, having a feedback input coupled to the output of the buffer amplifier, and having an output node;

a source current output transistor, having a conduction path coupled between a first voltage and the output of the buffer amplifier, and having a control electrode coupled to the output node of the differential stage;

a sink current output transistor, having a conduction path coupled between a second voltage and the output of the buffer amplifier, and having a control electrode coupled to the output node of the differential stage; and an enable transistor having an input for receiving the mode select signal, the enable transistor connected to the control electrode of the source current output transistor in such a manner that the source current output transistor is forced off responsive to the mode select signal indicating that the speed control mode is enabled; and a digital-to-analog converter, for receiving a digital current limit signal and for generating an output signal coupled to the first input of the buffer amplifier.

8. A method of controlling the speed of a motor, comprising the steps of:

in a current control mode, generating a first drive signal corresponding to a limit input signal by a buffer amplifier comprising a source output leg and a sink output leg;

in the current control mode, applying the first drive signal from the source output leg of the buffer amplifier to an input of a drive amplifier to cause the drive amplifier to drive the motor;

monitoring the speed of the motor;

detecting a difference between the monitored speed of the motor and a signal indicating the desired motor speed;

generating a second drive signal corresponding to the detected difference;

enabling a speed control mode;

in the speed control mode, applying the second drive signal to the input of the drive amplifier;

comparing the signal applied to the input of the drive amplifier with the limit input signal; and responsive to the signal at the input of the drive amplifier exceeding the limit input signal, discharging current from the input of the drive amplifier through the sink output leg of the buffer amplifier.

9. The method of claim 8, further comprising:

after the step of enabling the speed control mode, disabling the source output leg of the buffer amplifier while leaving the sink output leg enabled.

10. The method of claim 9, further comprising:

in the speed control mode, comparing the signal applied to the input of the drive amplifier with the limit input signal; and responsive to the signal at the input of the drive amplifier exceeding the limit input signal, discharging current from the input of the drive amplifier through the sink output leg of the buffer amplifier.

11. The method of claim 8, wherein the monitoring, detecting, and generating steps are performed by a locked-loop-type circuit;

and wherein the step of applying the second drive signal comprises:

responsive to the step of enabling the speed control mode, switching the input of the drive amplifier from the buffer amplifier to the output of the locked-loop type circuit.

12. A motor system, comprising:

a polyphase DC motor having a plurality of coils;

a drive amplifier, having a plurality of outputs each coupled to an associated coil, for driving the coils of the motor responsive to a drive signal applied to an input of the drive amplifier;

a phase detector, having a first input for receiving a feedback signal indicating the speed of the motor and having a second input for receiving a command signal, for generating a signal corresponding to the difference in phase between a signal received on said first input and a signal received on said second input;

circuitry for generating a drive signal responsive to the signal from the phase detector, said drive signal being an analog signal dependent on the amplitude of the drive to be applied to the motor; and a buffer amplifier having a first input for receiving a current limit signal, having a feedback input, and having an output coupled to the input of the drive amplifier and to the feedback input of the buffer amplifier, for controlling the amplitude of the drive signal applied to the drive amplifier in a manner corresponding to the current limit signal;

wherein the buffer amplifier operates to both sink current from and source current to the input of the drive amplifier in a current control mode, and to sink excess current from but not source current to the input of the drive amplifier in a speed control mode.

13. The motor system of claim 12, further comprising:

a digital-to-analog converter, for receiving a digital current limit signal and for generating an output signal coupled to the first input of the buffer amplifier.

14. The motor system of claim 12, wherein the buffer amplifier has a control input for receiving a mode select signal indicating whether the current control mode or the speed control mode is enabled.

15. A motor system comprising:

a polyphase DC motor having a plurality of coils;

a drive amplifier, having a plurality of outputs each coupled to an associated, for driving the coils of the motor responsive to a drive signal applied to an input of the drive amplifier;

a phase detector, having a first input for receiving a feedback signal indicating the speed of the motor and having a second input for receiving a command signal, for generating a signal corresponding to the difference in phase between a signal received on said first input and a signal received on said second input;

circuitry for generating a drive signal responsive to the signal from the phase detector; and a clamp circuit, having an input for receiving a current limit signal, and having an output coupled to the drive amplifier, for providing a controlled voltage to the drive amplifier corresponding to the current limit signal, said clamp circuit comprising a buffer amplifier having a first input for receiving a signal corresponding to the current limit signal, having a feedback input, and having a control input for receiving a mode select signal indicating whether the current control mode or the speed control mode is enabled, and having an output coupled to the input of the drive amplifier and coupled to the feedback input of the buffer amplifier, wherein the buffer amplifier operates to sink current from and source current to the input of the drive amplifier in a current control mode, and to sink excess current from the input of the drive amplifier in a speed control mode, and wherein the buffer amplifier comprises:

a differential stage, having a first input for receiving the signal corresponding to the current limit signal, having a feedback input coupled to the output of the buffer amplifier, and having an output node;

a source current output transistor, having a conduction path coupled between a first voltage and the output of the buffer amplifier, and having a control electrode coupled to the output node of the differential stage;

a sink current output transistor, having a conduction path coupled between a second voltage and the output of the buffer amplifier, and having a control electrode coupled to the output node of the differential stage, and an enable transistor having an input for receiving the mode select signal, the enable transistor connected to the control electrode of the source current output transistor in such a manner that the source current output transistor is forced off responsive to the mode select signal indicating that the speed control mode is enabled.

16. The motor system of claim 12, wherein the generating circuitry comprises:

a charge pump, having an input coupled to the phase detector and having an output coupled to the drive amplifier.

17. A motor system, comprising:

a polyphase DC motor having a plurality of coils;

a drive amplifier, having a plurality of output each coupled to an associated coil, for driving the coils of the motor responsive to a drive signal applied to an input of the drive amplifier;

a phase detector, having a first input for receiving a feedback signal indicating the speed of the motor and having a second input for receiving a command signal, for generating a signal corresponding to the difference in phase between a signal received on said first input and a signal received on said second input;

circuitry for generating a drive signal responsive to the signal from the phase detector;

a clamp circuit, having an input for receiving a current limit signal, and having an output coupled to the drive amplifier, for providing a controlled voltage to the drive amplifier corresponding to the current limit signal; and a switch, having a first input for receiving the output of the generating circuitry, having a second input for receiving the output of the clamp circuit, having a control input for receiving a mode select signal indicating whether a current control mode or a speed control mode is enabled, and having an output coupled to the input of the drive amplifier, wherein the switch couples the output of the clamp circuit to the input of the drive amplifier in the current control mode, and couples the output of the generating circuitry to the input of the drive amplifier in the speed control mode.

18. An amplifier circuit, operable in a push-pull operating mode to source and sink current at an amplifier output, and in a pull-down operating mode to sink current at the amplifier output, comprising:

a first differential input stage, for receiving first and second input signals and for producing a first intermediate output signal responsive thereto;

a first output transistor, having a conduction path connected between a first voltage and the amplifier output, and having a control electrode coupled to receive the first intermediate output signal;

a second output transistor, having a conduction path connected between a second voltage and the amplifier output, and having a control electrode coupled to receive the first intermediate output signal; and means for controlling said first output transistor responsive to a mode select signal, so that both said first and second output transistors are operable in the push-pull operating mode, and so that, in the pull-down operating mode, the first output transistor is disabled from operating and the second output transistor is operable.

19. The amplifier of claim 18, wherein said controlling means comprises:

a mode select transistor, having a conduction path connected between the control electrode of said first output transistor and a disable voltage, and having a control electrode for receiving a mode select signal, so that when the mode select signal is at a first logic level indicating selection of the push-pull operating mode, said mode select transistor is turned off, and so that when the mode select signal is at a second logic level indicating selection of the pull-down operating mode, said mode select transistor is turned on so as to connect the disable voltage to the control electrode of the first output transistor to force it off.

20. The amplifier circuit of claim 18, wherein the first intermediate signal comprises first and second differential voltages; and further comprising:

a second differential input stage, having first and second inputs coupled to receive the first and second differential voltages, for presenting a second intermediate output signal responsive to the differential voltage between the first and second differential voltages.

\* \* \* \* \*